(12) United States Patent
Brausse

(10) Patent No.: US 10,519,996 B2
(45) Date of Patent: Dec. 31, 2019

(54) POSITIONING APPARATUS

(71) Applicant: Dr. Ing. h.c. F. Porsche Aktiengesellschaft, Stuttgart (DE)

(72) Inventor: Stephan Brausse, Eningen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 148 days.

(21) Appl. No.: 15/823,947

(22) Filed: Nov. 28, 2017

(65) Prior Publication Data
US 2018/0149180 A1 May 31, 2018

(30) Foreign Application Priority Data

Nov. 28, 2016 (DE) ........................ 10 2016 122 873

(51) Int. Cl.
| | | |
|---|---|---|
| F16B 7/04 | (2006.01) |
| F15B 1/04 | (2006.01) |
| B62D 25/02 | (2006.01) |
| B62D 21/15 | (2006.01) |
| B62D 21/16 | (2006.01) |
| F15B 1/02 | (2006.01) |
| B62D 29/00 | (2006.01) |

(52) U.S. Cl.
CPC ............ *F16B 7/0406* (2013.01); *B62D 21/15* (2013.01); *B62D 21/16* (2013.01); *B62D 25/025* (2013.01); *F15B 1/02* (2013.01); *F15B 1/04* (2013.01); *F16B 7/0413* (2013.01); *B62D 29/008* (2013.01); *F15B 2201/21* (2013.01); *F15B 2201/60* (2013.01)

(58) Field of Classification Search
CPC ...... B62D 21/15; B62D 21/16; B62D 25/025; B62D 29/008; F15B 1/02; F15B 1/04; F15B 2201/21; F15B 2201/60; F15B 2201/605; F16B 7/0413; F16B 7/0406
See application file for complete search history.

(56) References Cited

U.S. PATENT DOCUMENTS

| | | | |
|---|---|---|---|
| 4,531,870 A | 7/1985 | Moryl et al. | |
| 5,487,556 A * | 1/1996 | Jenkins | B60R 21/2171 280/728.2 |
| 5,503,492 A | 4/1996 | Stevens et al. | |
| 7,641,219 B2 * | 1/2010 | Wagener | B60R 21/2171 24/484 |
| 8,215,674 B2 | 7/2012 | Persson | |

(Continued)

FOREIGN PATENT DOCUMENTS

| | | |
|---|---|---|
| DE | 19533707 A1 | 3/1996 |
| DE | 19963068 A1 | 6/2001 |

(Continued)

OTHER PUBLICATIONS

German Search Report for German Application No. 10 2016 122 873.7, dated Aug. 4, 2017, with partial English translation—8 Pages.

*Primary Examiner* — Jermie E Cozart
(74) *Attorney, Agent, or Firm* — RatnerPrestia

(57) ABSTRACT

A positioning apparatus for positioning a tubular fluid container in an elongate carrier which is configured as a hollow profile. In order to simplify the positioning of the tubular fluid container, the positioning apparatus includes spring elements, by way of which the tubular fluid container is positioned in the elongate carrier.

9 Claims, 1 Drawing Sheet

(56) References Cited

U.S. PATENT DOCUMENTS

| | | | | |
|---|---|---|---|---|
| 2008/0012275 A1* | 1/2008 | Pinsenschaum | ...... | B60R 21/232 |
| | | | | 280/730.2 |
| 2016/0355152 A1* | 12/2016 | Perez Garcia | .......... | B60R 21/36 |
| 2017/0036629 A1* | 2/2017 | Ishizaki | ............. | B62D 25/2036 |

FOREIGN PATENT DOCUMENTS

| | | |
|---|---|---|
| DE | 10224884 A1 | 12/2003 |
| DE | 102004010144 A1 | 9/2005 |
| EP | 2027006 A1 | 2/2009 |
| EP | 2716524 A1 | 4/2014 |

* cited by examiner

POSITIONING APPARATUS

CROSS-REFERENCE TO RELATED APPLICATION

This application claims priority to German Patent Application No. DE 10 2016 122873.7, filed Nov. 28, 2016, the contents of such application being incorporated by reference herein in their entirety.

FIELD OF THE INVENTION

The invention relates to a positioning apparatus for positioning a tubular fluid container in an elongate carrier which is configured as a hollow profile.

BACKGROUND OF THE INVENTION

U.S. Pat. No. 5,503,492, which is incorporated by reference herein, discloses fixing a tubular threaded receptacle for a threaded bolt in a hollow profile with the aid of spring elements.

SUMMARY OF THE INVENTION

The device described herein is intended to simplify the positioning of a tubular fluid container in an elongate carrier which is configured as a hollow profile, in particular during the manufacture of motor vehicles.

In a positioning apparatus for positioning a tubular fluid container in an elongate carrier which is configured as a hollow profile, the positioning apparatus comprises spring elements, by way of which the tubular fluid container is positioned in the elongate carrier. The tubular fluid container can advantageously be mounted in a sprung manner in the elongate carrier by way of the spring elements. As a result, the accommodation of tubular fluid containers in elongate carriers, in particular a carrying structure of a motor vehicle, is simplified and improved considerably. Fastening from the outside is advantageously not required. Moreover, the claimed positioning apparatus is insensitive with regard to tolerances.

One preferred exemplary embodiment of the positioning apparatus is distinguished by the fact that the positioning apparatus is combined with a fastening apparatus, with the aid of which the tubular fluid container which is positioned in the elongate carrier by way of the spring elements is mounted in a sprung manner and can be fastened releasably. The tubular fluid container preferably has substantially a round cross section. The elongate carrier preferably has substantially a rectangular cross section. With regard to the fastening of the tubular fluid container in the elongate carrier, "releasably" means that the tubular fluid container can also be dismantled repeatedly without destruction.

A further preferred exemplary embodiment of the positioning apparatus is distinguished by the fact that the positioning apparatus comprises at least three spring elements which are preferably leaf spring-like, are attached to the outside of the tubular fluid container, and are oriented about a longitudinal axis of the tubular fluid container in such a way that the tubular fluid container is braced in the elongate carrier when the tubular fluid container is rotated in the elongate carrier in a positioning rotational direction. The leaf spring-like spring elements extend, for example, substantially over the entire length of the tubular fluid container. The leaf spring-like spring elements can also be attached, however, only on defined axial sections, for example at the ends and/or in the middle of the tubular fluid container. As viewed in cross section, the leaf spring-like spring elements preferably have substantially the shape of circular arcs.

A further preferred exemplary embodiment of the positioning apparatus is distinguished by the fact that the tubular fluid container can be moved in a relieved manner in the elongate carrier in the direction of its longitudinal axis when the tubular fluid container is rotated in the elongate carrier in a free rotational direction which is opposed to the positioning rotational direction. By way of rotation of the tubular fluid container in the positioning rotational direction, the tubular fluid container is braced in the elongate carrier. Stable, sprung mounting of the tubular fluid container in the elongate carrier can be achieved in a simple way as a result. By way of rotation of the tubular fluid container in the free rotational direction, the tubular fluid container is relieved in the elongate carrier. Simple mounting and dismantling of the tubular fluid container are made possible as a result.

A further preferred exemplary embodiment of the positioning apparatus is distinguished by the fact that the spring elements are attached on the tubular fluid container and configured in such a way that the spring elements become caught in the elongate carrier when the tubular fluid container is rotated in the positioning rotational direction. Undesired releasing, moving and/or rotating of the mounted tubular fluid container in the elongate carrier are/is prevented in a simple way as a result. For this purpose, a corresponding structure can be provided on the spring elements and/or on the inside of the elongate carrier. The structure is, for example, a toothing system which makes it possible for the spring elements to become caught in the elongate carrier. As an alternative or in addition, the structure can be provided by a surface with an increased roughness, in order to increase the friction between the spring elements and the elongate carrier, preferably in a manner which is dependent on the rotational direction.

A further preferred exemplary embodiment of the positioning apparatus is distinguished by the fact that the elongate carrier has an angular, in particular rectangular, cross-sectional profile with corners, in which the spring elements become caught when the tubular fluid container is rotated in the positioning rotational direction. Here, four spring elements are preferably attached to the tubular fluid container, advantageously distributed uniformly in the circumferential direction. The preferably leaf spring-like spring elements are advantageously prestressed in such a way that, during a reverse rotation, that is to say when the tubular fluid container is rotated in the positioning rotational direction, they fold over and become caught in the corners of the rectangular cross-sectional profile. The rectangular cross-sectional profile is preferably of square configuration. During the reverse rotation or rotation of the tubular fluid container in the positioning rotational direction, the spring elements are to extend with their free ends into the corners or edges of the rectangular cross-sectional profile. Defined, braced positioning of the tubular fluid container in the elongate carrier is made possible in a simple way as a result.

A further preferred exemplary embodiment of the positioning apparatus is distinguished by the fact that the tubular fluid container is a fluidic pressure accumulator. The fluidic pressure accumulator serves, preferably in a motor vehicle, to store fluidic energy in the form of a fluid which is loaded with pressure. The fluid is preferably a hydraulic medium. The fluid container or the fluidic pressure accumulator is then also called a hydraulic accumulator or a hydraulic pressure accumulator. The fluid which is stored in the fluidic pressure accumulator is particularly advantageously compressed air.

A further preferred exemplary embodiment of the positioning apparatus is distinguished by the fact that the elongate carrier is a sill of a motor vehicle. The elongate carrier, in particular the sill, is advantageously configured as an extruded profile.

A further preferred exemplary embodiment of the positioning apparatus is distinguished by the fact that a lever is attached at one end of the tubular fluid container, via which lever the tubular fluid container can be rotated in the elongate carrier, it being possible for the lever to be fixed relative to the elongate carrier, in order to hold the tubular fluid container in position in a stable manner in the elongate carrier. The lever serves to provide the above-described fastening apparatus. By way of the lever, the tubular fluid container can be rotated in a simple way both in the positioning rotational direction and in the free rotational direction. The mounting and the dismantling of the tubular fluid container are simplified considerably as a result. The fixing of the lever relative to the elongate carrier takes place, for example, with the aid of a fastening means, such as a screw, by way of which the lever is fixed in a defined position relative to the elongate carrier.

Furthermore, the invention relates to a tubular fluid container having an above-described positioning apparatus. The positioning apparatus, in particular the spring elements, is/are preferably fastened radially on the outside to the tubular fluid container.

Furthermore, the invention relates to an elongate carrier, in which a tubular fluid container is positioned with the aid of an above-described positioning apparatus. The elongate carrier is preferably part of a carrying structure of a motor vehicle.

The invention possibly also relates to a motor vehicle having a carrying structure of this type. The elongate carrier is preferably a sill of the motor vehicle.

Furthermore, the invention relates to a method for mounting a tubular fluid container in an elongate carrier with the aid of an above-described positioning apparatus.

BRIEF DESCRIPTION OF THE DRAWINGS

Further advantages, features and details of the invention result from the following description, in which different exemplary embodiments are described in detail with reference to the drawing, in which.

DETAILED DESCRIPTION OF THE INVENTION

Figure 1:
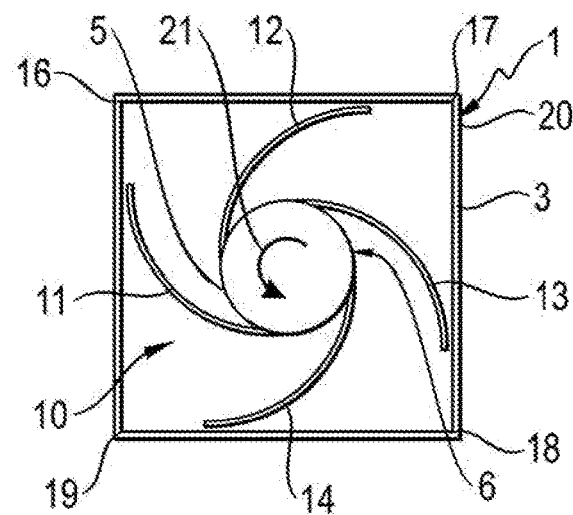
FIG. 1 shows an elongate carrier in cross section during the mounting of a tubular fluid container.
Figure 2:
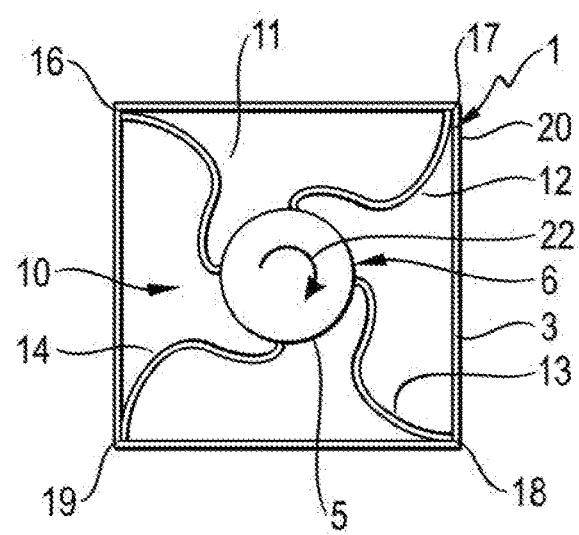
FIG. 2 shows the elongate carrier from FIG. 1 with the tubular fluid container in cross section, which is positioned in the elongate carrier with the aid of a positioning apparatus.

FIGS. 1 and 2 show an elongate carrier 1 in cross section. The elongate carrier 1 is configured as a hollow profile 3 with a rectangular cross section. The elongate carrier 1 is, for example, a sill of a motor vehicle.

A tubular fluid container 5 is arranged in the elongate carrier 1. The tubular fluid container 5 is, for example, likewise configured as a hollow profile with a circular cross section.

The tubular fluid container 5 is a fluidic pressure accumulator 6, in particular a hydraulic pressure accumulator. The pressure accumulator 6 serves to store fluidic energy, in particular hydraulic energy.

The tubular fluid container 5 can be positioned in the elongate carrier 1 with the aid of a positioning apparatus 10. The positioning apparatus 10 comprises a total of four leaf spring-like spring elements 11 to 14. With the aid of the spring elements 11 to 14, the tubular fluid container 5 can advantageously be mounted in the elongate carrier 1 in a sprung manner.

The elongate carrier 1 has an angular cross-sectional profile 20. The angular cross-sectional profile 20 is configured in FIG. 1 as a square with four corners 16 to 19.

In FIG. 1, a free rotational direction is indicated by way of an arrow 21. When the tubular fluid container 5 is rotated in the elongate carrier 1 in its free rotational direction 21, the tubular fluid container 5 can be mounted in the elongate carrier 1 in a simple way.

During mounting, the tubular fluid container 5 is introduced into the elongate carrier 1 (perpendicularly with respect to the plane of the drawing in FIG. 1). Here, the free ends of the spring elements 11 to 14 are spaced apart from the inner faces of the elongate carrier 1 or slide along them.

In FIG. 2, a positioning rotational direction is indicated by way of an arrow 22. When the tubular fluid container 5 is rotated in the elongate carrier 1 in the positioning rotational direction 22, the tubular fluid container 5 is particularly advantageously braced in the elongate carrier 1. Here, the free ends of the spring elements 11 to 14 come into frictional contact with the inner faces of the elongate carrier 1. The free ends of the spring elements 11 to 14 particularly advantageously become caught in the elongate carrier 1, advantageously by way of the formation of a positively locking connection.

By way of rotation of the tubular fluid container 5 in the positioning rotational direction 22, the tubular fluid container 5 is firstly positioned in the elongate carrier 1 in a stable manner. Moreover, the tubular fluid container 5 is mounted in the elongate carrier 1 in a sprung manner. By way of the sprung mounting, the tubular fluid container 5 is decoupled from the elongate carrier 1.

It can be seen in FIG. 2 that the leaf spring-like spring elements 11 to 14 fold over during the rotation in the positioning rotational direction 22. As a result of the attempt of the spring elements 11 to 14 to extend, the spring elements 11 to 14 become caught with their free ends in the corners 16 to 19 of the square hollow cross-sectional profile 20. As a result, the tubular fluid container 5 is mounted stably in a sprung manner in the elongate carrier 1 in a simple way.

Figure 3:
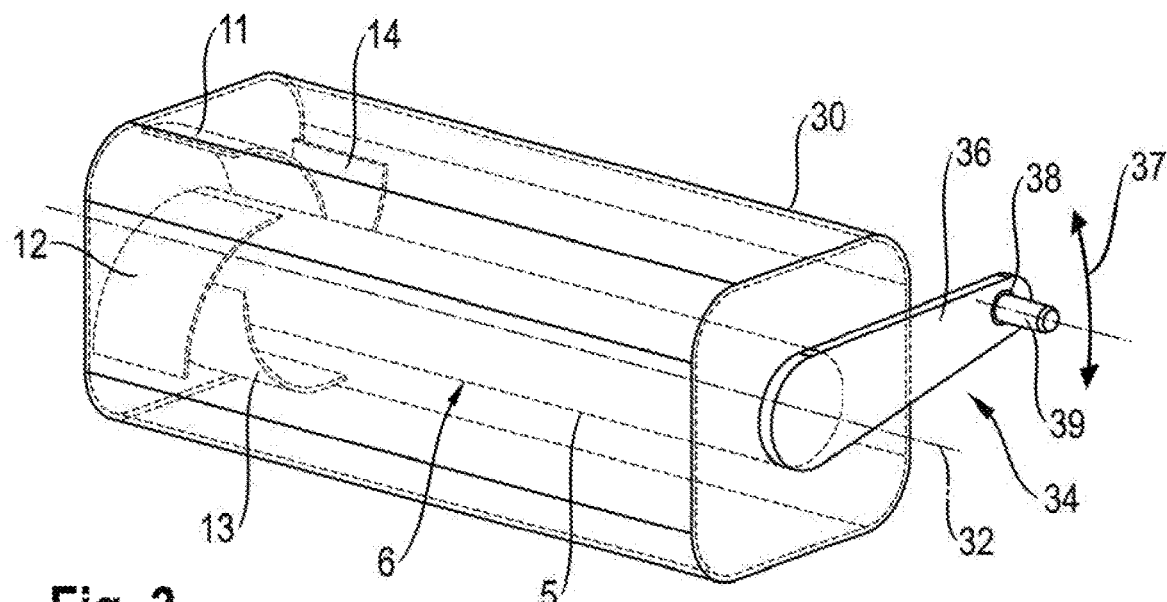
FIG. 3 shows a simplified perspective illustration of one exemplary embodiment of the elongate carrier with the tubular fluid container and the positioning apparatus which is combined with a fastening apparatus.

In the perspective illustration of FIG. 3, the elongate carrier which is denoted by 1 in FIGS. 1 and 2 is indicated by way of a rectangular hollow cross-sectional profile 30. A longitudinal axis of the tubular fluid container 5 is indicated by way of a dash-dotted line 32.

The hollow cross-sectional profile 30 is square, just like the hollow cross-sectional profile 20 in FIGS. 1 and 2. The square hollow cross-sectional profile 30 in FIG. 3 is configured with rounded corners, however. The catching of the free ends of the leaf spring-like spring elements 11 to 14 is ensured, for example, by way of a corresponding structure, such as a toothing system, of the spring elements 11 to 14 and/or on the inside of the elongate carrier 1.

Four leaf spring-like spring elements 11 to 14 which correspond to the leaf spring-like spring elements 11 to 14 in FIGS. 1 and 2 are indicated at the left-hand end (in FIG. 3) of the tubular fluid container 5.

A lever 36 is attached in order to provide a fastening apparatus 34 at the right-hand end (in FIG. 3) of the tubular fluid container 5.

A double arrow 37 indicates that the tubular fluid container 5 can be rotated via the lever 36 either in the free rotational direction (21 in FIG. 1) or in the positioning rotational direction (22 in FIG. 2). As a result, the rotation during the mounting and/or dismantling of the tubular fluid container 5 is simplified considerably.

At its free end, the lever 36 has a through hole 38. A fastening means is indicated by way of a line 39, with the aid of which fastening means the lever 36 can be fixed in a desired position.

The fastening means 39 is, for example, a screw which is plugged through the through hole 38 and is screwed into an associated thread (not shown) on a stationary carrying structure.

What is claimed is:

1. A positioning apparatus for positioning a tubular fluid container in an elongated and hollow carrier, wherein the positioning apparatus comprises (i) spring elements by way of which the tubular fluid container is positioned in the elongated carrier, and (ii) a releasable fastening apparatus for positioning the tubular fluid container in the elongated carrier by way of the spring elements in a sprung manner.

2. The positioning apparatus as claimed in claim 1, wherein the tubular fluid container is a fluidic pressure accumulator.

3. The positioning apparatus as claimed in claim 1, wherein the elongated carrier is a sill of a motor vehicle.

4. The positioning apparatus as claimed in claim 1, wherein the fastening apparatus is a lever that is attached at one end of the tubular fluid container, via which lever the tubular fluid container is configured to be rotated in the elongated carrier, the lever being fixed relative to the elongated carrier in order to hold the tubular fluid container in position in a stable manner in the elongated carrier.

5. A positioning apparatus for positioning a tubular fluid container in an elongated and hollow carrier, wherein the positioning apparatus comprises spring elements by way of which the tubular fluid container is positioned in the elongated carrier, wherein the positioning apparatus comprises at least three of said spring elements, which are leaf springs and are attached to an outside of the tubular fluid container, the leaf springs being oriented about a longitudinal axis of the tubular fluid container in such a way that the tubular fluid container is braced in the elongated carrier when the tubular fluid container is rotated in the elongated carrier in a positioning rotational direction.

6. The positioning apparatus as claimed in claim 5, wherein the tubular fluid container is configured to be moved in a relieved manner in the elongated carrier in a direction of the longitudinal axis when the tubular fluid container is rotated in the elongated carrier in a free rotational direction which is opposed to the positioning rotational direction.

7. The positioning apparatus as claimed in claim 6, wherein the elongated carrier has an angular or rectangular cross-sectional profile with corners, in which the spring elements are configured to become caught when the tubular fluid container is rotated in the positioning rotational direction.

8. A method for positioning a tubular fluid container in an elongated and hollow carrier, comprising:
   inserting the tubular fluid container in the elongated and hollow carrier; and
   rotating the tubular fluid container in one rotational direction such that spring elements extending from the tubular fluid container become caught on interior edges, surfaces or corners of the elongated and hollow carrier.

9. The method of claim 8, wherein rotation of the tubular fluid container in an opposite rotational direction does not cause the spring elements to become caught on the interior edges, surfaces or corners of the elongated and hollow carrier.

* * * * *